Nov. 11, 1924.  1,515,455

W. BROSCHEIT

ATOMIZING GASKET

Filed June 2, 1923

Inventor

W. Broscheit.

By Lacey & Lacey, Attorneys

Patented Nov. 11, 1924.

1,515,455

UNITED STATES PATENT OFFICE.

WILHELM BROSCHEIT, OF WAYNE, NEBRASKA.

ATOMIZING GASKET.

Application filed June 2, 1923. Serial No. 642,994.

*To all whom it may concern:*

Be it known that I, WILHELM BROSCHEIT, citizen of the United States, residing at Wayne, in the county of Wayne and State of Nebraska, have invented certain new and useful Improvements in Atomizing Gaskets, of which the following is a specification.

This invention relates to an improved atomizing gasket for internal combustion engines and seeks, among other objects, to provide a device of this character which may be interposed between the carburetor and intake manifold and which will function to break up and nebulize the fuel mixture flowing from the carburetor to the manifold whereby better combustion will be had with a corresponding reduction in the consumption of fuel.

The invention seeks, as a further object, to provide a device which may, without the necessity for structural change therein, be employed in connection with the engines of different makes.

And the invention seeks, as a still further object, to provide a device which will be characterized by structural simplicity and which may, accordingly, be produced and sold at moderate cost.

Other and incidental objects will appear hereinafter.

Figure 2:
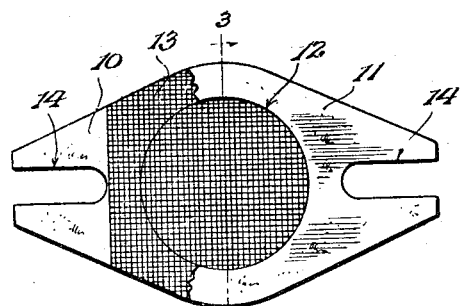
Figure 2 is an elevation of the device partly broken away and shown in section.
Figure 3:
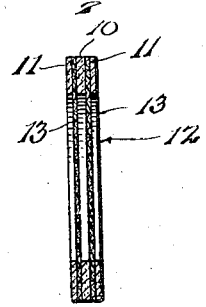
Figure 3 is a transverse sectional view on the line 3—3 of Figure 2, looking in the direction of the arrows.

In carrying the invention into effect, I employ a laminated gasket body comprising a center plate 10 at opposite sides of which are arranged relatively thin side plates 11. The plates are flat and may be of asbestos or other suitable material. Formed through the plates is a central opening 12 and extending across said opening are parallel mixing screens 13 lying flat against opposite sides of the plate 10, the screens being clamped between said plate and the side plates 11. The plates are adhesively secured together, preferably by shellac, so that said plates will be united throughout their contacting areas to form the gasket body into a unitary structure and, as will be appreciated, the adhesive will harden in the interstices of the mixing screens at the portions thereof which are covered by the plates for connecting the screens with the plates and rigidly anchoring said screens to extend taut across the openings 12 of the gasket body. Furthermore, the shellac will serve to waterproof the gasket body. As brought out in Figure 2 of the drawings, the gasket body is provided with tapered ends and formed in the body of the gasket to open through the ends thereof are medial horizontal slots 14, it being noted in this connection, that the screens 13 terminate short of said slots so as to prevent injury to the screens by fastening devices extending through the slots.

Figure 1:
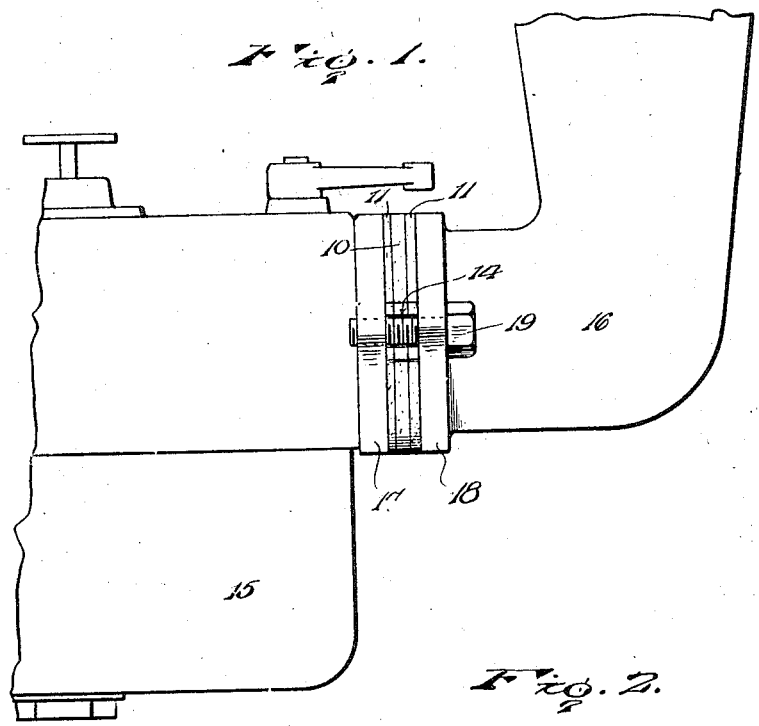
Figure 1 is a fragmentary side elevation showing my improved atomizing gasket in connection with a conventional carburetor and intake manifold.

In Figure 1 of the drawings, I have shown the device in connection with a conventional carburetor 15 and engine intake manifold 16. As is usual, the carburetor is provided at the outlet thereof with a flange 17 while the manifold is provided with a similar flange 18. The gasket is shaped to fit between said flanges registering with the ports of the carburetor and manifold and, as shown, the slots 14 of the gasket are adapted to accommodate the usual bolts 19 connecting the carburetor with the manifold and clamping the gasket between the flanges 17 and 18. Thus, fuel mixture flowing from the carburetor to the manifold will be caused to pass through the screens 13 of the gasket to be broken up and nebulized thereby with a resultant increase in combustibility of the mixture. Thus, fuel consumption may be proportionately reduced with a corresponding saving of fuel. I accordingly provide a particularly efficient device for the purpose set forth and attention is now directed to the fact that by forming the gasket with the slots 14, the device may be readily employed in connection with carburetors and manifolds of different sizes, the slots being adapted to accommodate variation in the spacing between the carburetor attaching bolts.

Having thus described the invention, what is claimed as new is:

In an atomizing gasket, the combination of three superposed fibrous laminations comprising a center lamination and side laminations each provided with a central opening and notched at its ends, a pair of screens positioned between the laminations at opposite sides of said center lamination, and adhesive connecting the laminations with each other and anchoring said screens to form a gasket body having the openings of the laminations registering to form an orifice covered by said screens and having said notches registering to form slots at the ends of the body to receive fastening devices, said adhesive forming the sole bond between the laminations and said screens terminating short of said slots whereby the pressure of opposed elements clamping the gasket body therebetween will be localized centrally of the body about said orifice.

In testimony whereof I affix my signature.

WILHELM BROSCHEIT. [L. S.]